3,207,620
LIGHT STABILIZATION OF NYLON
Philip B. Roth, Somerville, N.J., assignor to American Cyanamid Company, Stamford, Conn., a corporation of Maine
No Drawing. Filed May 18, 1962, Ser. No. 195,976
7 Claims. (Cl. 117—33.5)

This invention relates in general to a novel method and composition for reduction of the strength degradation and for sunlight stabilization of certain hydrophobic polymeric materials in fiber form and the light stabilized product obtained thereby. More particularly, the invention concerns the light stabilization of those hydrophobic polymeric superpolyamides known as nylon, which materials are recognized to be extremely susceptible to light degradation particularly by the ultraviolet light portion of the visible spectrum.

This invention in general relates to a new method of treating super-polyamide fibers with a compound of the structure:

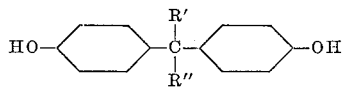

wherein R' and R" represent hydrogen or lower alkyl groups having from about $C_1$–$C_7$ carbon atoms. Typically, 2,2-bis(4-hydroxyphenyl)propane is such a compound, the use of which according to this invention results in a novel light stable product characterized by a non-uniform dense band of said compound impregnated into the peripheral regions of a super-polyamide fiber and a more sparse concentration of the compound in the central region of such a fiber.

My super-polyamide stabilizer is applied generally as an oil-in-water emulsion to the fiber or fabric composed thereof by any conventional method of application such as by immersion of the fabric in a bath composed of the treating emulsion. Upon application to the surface of the fiber, the treated fiber is subjected to drying and a dry heat treatment for from about 0.5 to 5 minutes at a temperature in excess of 225° F.

A surface penetration of the polyamide hydrophobic polymer by the 2,2-bis(4-hydroxyphenyl)propane is thus achieved which is neither so dispersed throughout the fiber as to be ineffective or so superfluous as to rub or wash off the fiber, but rather such that it will serve to fix in the fiber permanently and block the penetration thereof of the damaging components of sunlight.

While it is preferred to dry the super-polyamide fibers to which has been applied our light stabilizer before curing, it is also possible to combine these steps and reduce the total time of processing if so desired. In general, it appears that somewhat greater protection is afforded by drying before curing.

By the term "sunlight degradation" as it is employed herein, it is intended to refer to the total or partial disintegration of super-polyamide textile fibers in the presence of continued exposure to ordinary sunlight. Such degradation is manifest by a partial or complete loss of the tensile strength and cohesive nature of the fiber which causes it to crumble in the hand after prolonged exposure to sunlight of high intensity and to tensile strength losses of lesser degrees depending upon the time of exposure and intensity of sunlight.

Sunlight degradation of super-polyamides is believed to consist mainly of oxidation, therefore, many chemical compounds i.e. phenols, cresols, resorcinols, have been suggested as agents for reducing this oxidative effect of sunlight because of their known property of inhibiting oxidation. However, the compound 2,2-bis(4-hydroxyphenyl)propane found by me to be particularly useful in protecting super-polyamides is not known as a particularly good antioxidant and its usefulness in the present invention would hardly be expected. In this connection it is believed that, in some manner not entirely understood, my novel sunlight stabilizer acts to protect the integrity of the polymer linkage thereby.

It has long been recognized that fibers of the super-polyamide type become brittle initially and eventually deteriorate when exposed to sunlight. This is especially true when such fibers have been formed into fabrics such as draperies, curtains, sailcloth, tentage material, awnings, cordage and the like which by virtue of their end use these fabrics are exposed for protracted periods of time to the sunlight.

In an effort to avoid the damaging effect of sunlight on these fabrics, it has been proposed that there be incorporated into such fibers compounds such as 2,4-dihydroxyacetophenone, 2,4-dihydroxybenozophenone, 4-benzoylresorcinol and the like. For example, U.S. Patent No. 2,568,894 suggests the incorporation of the latter compound into the batch or dope from which nylon yarn is spun.

In attempts at the complete dispersion of the stabilizer, by introduction directly into the batch prior to formation of the filamental fiber such a thin random dispersion of the protective stabilizer in the fibers results that their protection is rendered negligible. In general, in such cases, after a protracted period of time of exposure to strong sunlight radiation, the tensile strength of the fibers is diminished to such an extent that the fabric which they comprise is essentially useless.

It is a primary object of the present invention to disclose as a novel light stabilizer for nylon the compound 2,2-bis(4-hydroxyphenyl)propane.

It is a further object of the invention to disclose a novel method for stabilizing super-polyamide fibers against the degrading effect of sunlight by the partial impregnation therein of the compound 2,2-bis(4-hydroxyphenyl)propane.

It is a still further object to disclose as a novel light-stable article of commerce a composition comprising a super-polyamide fiber having impregnated therein a light stablizing amount of the compound 2,2-bis(4-hydroxyphenyl)propane.

A further object of this invention is to provide a method of obtaining an effective impregnation of super-polyamide fibers with 2,2-bis(4-hydroxyphenyl)propane by the application of heat to fibers treated therewith.

Other objects of the invention will appear from the following description of the invention and the illustrative examples and comparative test data which illustrate the invention in more detail.

It is a particular and important aspect of my novel process that the drying step wherein the sunlight stabilizer is dried in contact with the fiber may be either a separate step conducted at room temperature preliminary to heat treatment at elevated temperatures greater than 25° F. to thermally impregnate the fibers, or it may be compounded or carried out simultaneously with said high temperature (greater than 225° F.) impregnation. In the latter case the fiber with the wet coating of light stabilizer is directly heat treated at the indicated high temperature as directed. The use of one or the other of these procedures insofar as the impartation of some measure of stabilization is concerned is a matter of choice based on available equipment and other process requirements. In the one step drying and heating of the light stabilizer on the fiber, the critical temperature limitation recited above, of course, also applies.

In general, our method involves application of my super-polyamide stabilizer to the fiber in the form of an oil-in-water emulsion of the 2,2-bis(4-hydroxyphenyl) propane followed by heat treatment and curing. The emulsion used may be in the range of from about 0.12% to about 5.0% solids and is applied so as to impart such amounts of stabilizer to the material based on its dry weight. Preferably the emulsion is prepared at a solids concentration of from about 0.25% to 2.0% and is applied so as to impart a like percent, based on the fabric dry weight. No catalysts are required to effect a cure on the fabric of my stabilizer.

We have found that the 2,2-bis(4-hydroxyphenyl) propane sunlight stabilizer exhibits excellent substantivity and affinity for the hydrophobic materials which it is designed to partially penetrate. The net results of such partial penetration is the formation of a barrier or band of the light stabilizing substance in the peripheral region of the fiber or film and with a more sparse concentration in the central region or area of the fiber or film which has been subjected to the curing treatment.

The sunlight stabilizer employed in my process may typically be padded, sprayed, applied by dipping, immersion and the like onto the outer surfaces of the fibers from an aqueous emulsion or solution of the stabilizer, the former containing a suitable emulsifying agent. After such application which is usually carried out at room temperature or at slightly elevated temperatures a concentrated layer of the stabilizer is located on or near the surface of the fiber which combination forms the substrate for the application of my subsequent processing step. The treated fiber may then be dried by conventional technique. Following the drying step, the heat impregnating step is carried out which involves heating the treated fiber to not less than about 225° F. nor more than about 350° F. for about 0.5 to 10 minutes (preferably 0.5 to about 5 minutes) to effect a surface penetration of the fibers by the stabilizer employed. As a result of this heat treatment the light stabilizer substance is so positioned in the fibers as to not only resist rubbing or washing from the surface thereof, but also to have sufficiently penetrated the fiber as to achieve a wide band of radiation absorptive particles therein.

It should be pointed out that the light stabilizers of the present invention due to their heat sensitivity may not be impregnated or even coated on the nylon substance in the manner conventional to the introduction of the well known dyestuffs such as those of the anthraquinone or thioindigo series, for instance, at temperatures in the range of 400° F. or better.

In addition to being heat sensitive at temperatures in excess of about 350° F. the sunlight stabilizers of my invention are soluble only in organic solvents. Therefore, when deposited on the surface of the super-polyamide film or fiber in a conventional pad bath, they are subject to removal upon subsequent treatment involving contact with organic solvents, unless otherwise fixed in the interior of the fiber.

Although the critical range of temperature of my heat treating step is broadly from 225–350° F., I prefer to operate my process so that the temperature of this step is about 300–325° F., depending to some extent on the percent of solids of stabilizer relative to and based on the dry weight of the fabric treated. The general rule followed is that at the higher temperatures less stabilizer solids need be employed and the treating time may be reduced within the general range of about 0.5–5 minutes.

The following examples illustrate some of the formulae, methods of application and test data obtained as a result thereof. These examples are intended purely to further explain and embody my invention and not to define or limit its scope. The proper scope of the invention can only be measured by reference to the appended claims. All parts and percentages contained herein are by weight unless otherwise indicated.

EXAMPLE 1

Prepare a solution containing 2,2-bis(4-hydroxyphenyl) propane by dissolving 30 parts of this compound in 47.5 parts of methyl 2-methoxypropyl ketone. Add to this 20 parts of the wetting agent nonylphenol ethoxylated with 9 mols of ethylene oxide and 2.5 parts of the emulsifier alkylphenoxypolyoxyethylene ethanol. This solution is labelled test sample A.

Following the same procedure as above but substitute 30 parts of 2,4-dihydroxybenzophenone for the 2,2-bis(4-hydroxyphenyl)propane. Label this test sample B.

Following the same procedure as indicated above but substitute 20 parts of 2,2',4,4'-tetrahydroxybenzophenone for the 2,2-bis(4-hydroxyphenyl)propane and 57.5 parts of the methyl 2-methoxypropyl ketone of part A. Label this test sample C.

EXAMPLE 2

Filament nylon taffeta is treated as follows with various dilutions of sodium A(2,2-bis(4-hydroxyphenyl)propane], solution B (2,4-dihydroxybenzophenone) or solution C (2,2',4,4'-tetrahydroxybenzophenone), the latter two being known ultraviolet light absorbing compounds.

Portions of the prepared solutions of Example 1 are diluted with water to form oil-in-water emulsions and are applied to nylon taffeta by padding on a three roll microset padder. The treated swatches are dried for one minute at 225° F. and then given a heat treatment for six minutes at 300° F. on a pin tenter frame.

After conditioning at 70° F. and 65% relative humidity, the swatches are tested initially for tensile strength and the results recorded. The remaining portion is then subjected to outdoor weathering for periods of two, four or six weeks. Swatches are removed and tested for tensile strength after each exposure period.

The results are shown in Table I below.

*Table I*

COMPARISON OF 2,2-BIS(4-HYDROXYPHENYL)PROPANE AGAINST KNOWN ULTRA VIOLET LIGHT ABSORBERS ON NYLON TAFFETA

| Solution used | Percent solids applied (owf.) | Initial warp strength (lbs.) | Percent strength loss after outdoor sunlight exposure | | |
|---|---|---|---|---|---|
| | | | 2 weeks | 4 weeks | 6 weeks |
| A | 0.25 | 104 | 41 | 65 | 67 |
| A | 0.50 | 104 | 35 | 47 | 67 |
| A | 1.00 | 120 | 23 | 37 | 50 |
| A | 2.00 | 107 | 6 | 33 | 62 |
| A | 5.00 | 103 | 0 | 6 | 50 |
| B | 0.25 | 115 | 44 | 67 | 83 |
| B | 0.50 | 110 | 39 | 46 | 77 |
| B | 1.00 | 115 | 48 | 48 | 65 |
| B | 2.00 | 112 | 22 | 50 | 67 |
| B | 5.00 | 123 | 5 | 19 | 51 |
| C | 0.25 | 98 | 48 | 65 | 80 |
| C | 0.50 | 101 | 51 | 41 | 68 |
| C | 1.00 | 110 | 42 | 36 | 62 |
| C | 2.00 | 123 | 0 | 10 | |
| Untreated | | 115 | 67 | 74 | 76 |

A=2,2-bis(4-hydroxyphenyl)propane.
B=2,4-dihydroxybenzophenone.
C=2,2',4,4'-tetrahydroxybenzophenone.

Table I demonstrates that in general and at the lower concentrations, 2,2-bis(4-hydroxyphenyl) propane is superior to the two known ultra violet light absorbers in protecting the nylon from sunlight degradation.

EXAMPLE 3

To determine the effect of drying vs. drying and curing, 3% solids of 2,2-bis(4-hydroxyphenyl)propane was applied to nylon taffeta by the method of Example 2. Portions of the treated material were dried at 225° F. for 30 seconds while another portion was dried as above followed by curing for 2.5 minutes at 325° F. Results are shown in Table II.

*Table II*

| Initial strength (Warp) | Percent tensile loss after outdoor exposure | |
|---|---|---|
| | 3 weeks | 7 weeks |
| Dried only—142 | 32 | 58 |
| Dry plus cure—132 | 24 | 34 |

Table II shows that in general greater protection is obtained when the treated material is cured after drying.

Swatches of this material were submerged in clear running water for 12 hours and dried and exposed. The results of this processing showed that the impregnation is resistant to water leaching and thus to rain water.

It will be evident that nylon finished in accordance with the present invention may be further finished as with softeners, stiffeners, lubricants and the like in accordance with procedures well known to those skilled in the art of textile finishing.

I claim:
1. A method for the stabilization of a solid hydrophobic superpolyamide polymeric material which comprises applying thereto a liquid dispersion containing stabilizing amounts of a compound of the general structure

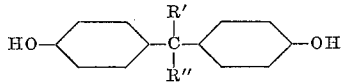

wherein R' and R" are selected from the group consisting of hydrogen and lower alkyl of from 1 to 7 carbon atoms, and thereafter heating the said material at a temperature within the range of 225° F. to about 350° F. for a period of time sufficient to effect a non-uniform penetration of the compound into the body of said super-polyamide material in an amount sufficient to stabilize it against the degrading effect of sunlight.

2. A solid hydrophobic super-polyamide polymer fiber stabilized against degradation by exposure to sunlight by the method of claim 1.

3. A method according to claim 1 wherein the compound is 2,2-bis(4-hydroixyphenyl)propane.

4. A method according to claim 1 in which the compound is applied in an amount of from about 0.12% to about 5% based on the dry weight of the super-polyamide material.

5. A solid hydrophobic super-polyamide polymer fiber stabilized against degradation by exposure to sunlight by the method of claim 3.

6. A method for the stabilization of a solid hydrophobic super- polyamide polymeric material which comprises applying thereto a liquid dispersion containing stabilizing amounts of a compound of the general structure:

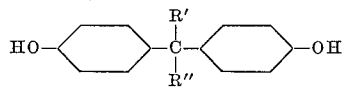

wherein R' and R" are selected from the group consisting of hydrogen and lower alkyl of from 1 to 7 carbon atoms, drying the material, and heating the dried material at a temperature within the range of 225° F. to about 350° F. for a period of time sufficient to effect a non-uniform penetration of the compound into the body of said super-polyamide material in an amount sufficient to stabilize it against the degrading effect of sunlight.

7. A method according to claim 6 wherein the compound is 2,2-bis(4-hydroxyphenyl)propane.

References Cited by the Examiner

UNITED STATES PATENTS

| 2,086,418 | 7/37 | Hunt et al. | 117—33.3 |
| 2,434,662 | 1/48 | Latham et al. | 260—45.95 |
| 2,790,739 | 4/57 | Kuhn et al. | 117—138.8 |
| 2,823,093 | 2/58 | Steiger | 117—138.8 |
| 2,899,341 | 8/59 | Dawson | 117—138.8 |
| 2,920,978 | 1/60 | Randall | 117—33.3 |
| 3,049,443 | 8/62 | Coleman | 117—33.3 |

WILLIAM D. MARTIN, *Primary Examiner.*

RICHARD D. NEVIUS, *Examiner.*

UNITED STATES PATENT OFFICE
CERTIFICATE OF CORRECTION

Patent No. 3,207,620 September 21, 1965

Philip B. Roth

It is hereby certified that error appears in the above numbered patent requiring correction and that the said Letters Patent should read as corrected below.

Column 1, line 36, for "oli-in-water" read -- oil-in-water --; column 2, line 58, for 25° F." read -- 225° F. --; column 4, line 9, for "Following" read -- Follow --; line 20, for "sodium" read -- solution --; line 64, for "2,2-bis(4-hydroxyphenyl) propane" read -- 2,2-bis(4-hydroxyphenyl)propane --; column 6, line 2, for "2,2-bis(4-hydroixyphenyl)propane" read -- 2,2-bis(4-hydroxyphenyl)propane --; line 11, for "super- polyamide" read -- super-polyamide --.

Signed and sealed this 14th day of June 1966.

(SEAL)
Attest:

ERNEST W. SWIDER
Attesting Officer

EDWARD J. BRENNER
Commissioner of Patents